(12) United States Patent
Jang et al.

(10) Patent No.: US 10,699,666 B2
(45) Date of Patent: Jun. 30, 2020

(54) DISPLAY DEVICE AND IMAGE SIGNAL PROCESSING METHOD OF THE SAME

(71) Applicant: LG ELECTRONICS INC., Seoul (KR)

(72) Inventors: Kyounghoon Jang, Seoul (KR); Kwangyeon Rhee, Seoul (KR); Byungtae Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/111,111

(22) Filed: Aug. 23, 2018

(65) Prior Publication Data
US 2019/0221186 A1    Jul. 18, 2019

(30) Foreign Application Priority Data
Jan. 17, 2018 (KR) .......................... 10-2018-0006238

(51) Int. Cl.
| | |
|---|---|
| *G06F 13/14* | (2006.01) |
| *G09G 5/00* | (2006.01) |
| *G09G 5/395* | (2006.01) |
| *H04N 5/00* | (2011.01) |
| *G09G 5/12* | (2006.01) |
| *G09G 5/18* | (2006.01) |

(52) U.S. Cl.
CPC ............ *G09G 5/006* (2013.01); *G09G 5/005* (2013.01); *G09G 5/12* (2013.01); *G09G 5/18* (2013.01); *G09G 5/395* (2013.01); *H04N 5/00* (2013.01); *G09G 2310/08* (2013.01); *G09G 2320/0247* (2013.01); *G09G 2340/0435* (2013.01); *G09G 2340/0471* (2013.01)

(58) Field of Classification Search
CPC . G09G 5/005; G09G 5/006; G09G 2340/0471
See application file for complete search history.

(56) References Cited

U.S. PATENT DOCUMENTS

| | | | | |
|---|---|---|---|---|
| 6,664,977 | B1 * | 12/2003 | Masumoto | ............ G09G 5/005 345/213 |
| 2002/0047922 | A1 * | 4/2002 | Minami | ................ G09G 5/006 348/500 |
| 2006/0187349 | A1 * | 8/2006 | Tanigawa | ............... G09G 5/008 348/500 |
| 2011/0069097 | A1 * | 3/2011 | Yoshida | ................ G09G 5/005 345/690 |

(Continued)

*Primary Examiner* — Charles Tseng
(74) *Attorney, Agent, or Firm* — Lee, Hong, Degerman, Kang & Waimey

(57) ABSTRACT

Disclosed are an image display device and an image processing method thereof. A signal processing method of the image display device according to the present invention is a signal processing method of an image display device configured to receive an image having a varied vertical synchronization signal, including detecting an input synchronization signal using an input image clock, extracting an input vertical synchronization signal from the input synchronization signal, delaying the input vertical synchronization signal by a reference value of an output clock, continuously tracking a falling region of the delayed input vertical synchronization signal, and finally generating an output synchronization signal in which a vertical front porch is varied.

12 Claims, 13 Drawing Sheets

(56) References Cited

U.S. PATENT DOCUMENTS

2012/0206461 A1* 8/2012 Wyatt .................... G09G 5/003
  345/501
2014/0307168 A1* 10/2014 Law ........................ H04N 5/04
  348/500

* cited by examiner

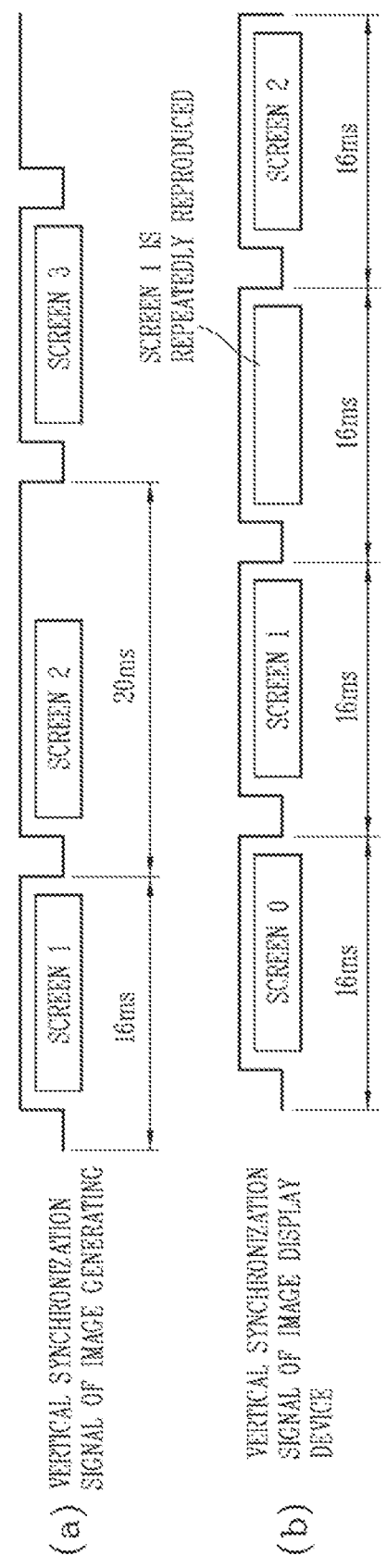

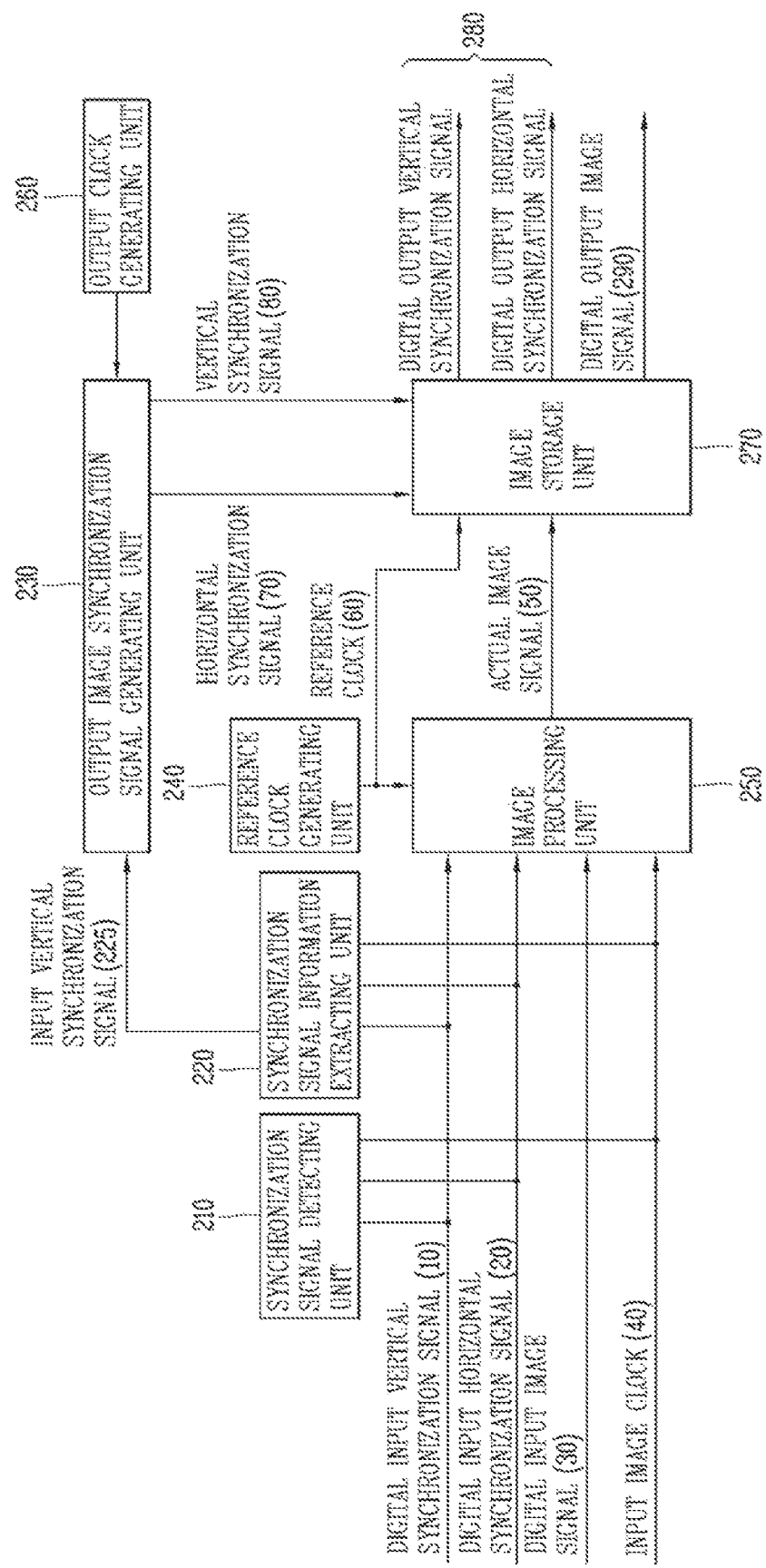

DISPLAY DEVICE AND IMAGE SIGNAL PROCESSING METHOD OF THE SAME

CROSS-REFERENCE TO RELATED APPLICATION

Pursuant to 35 U.S.C. § 119(a), this application claims the benefit of earlier filing date and right of priority to Korean Application No. 10-2018-0006238, filed on Jan. 17, 2018, the contents of which are all hereby incorporated by reference herein in its entirety.

BACKGROUND OF THE INVENTION

1. Field of the Invention

The present disclosure relates to an image display device capable of processing an image having a varied vertical synchronization signal and a signal processing method thereof.

2. Background of the Invention

An image display device is a device having a function of providing an image that a user may view. The user may view various images such as broadcast through the video display device.

The image display device may be connected to an external image generating device and receive images having various sizes applied thereto. In this case, the image display device temporarily stores a synchronization signal and a digital-converted original image signal received exactly at a time of the synchronization signal in an image storage memory inside the image display device. Thereafter, the image display device internally generates a synchronization signal according to a ratio of an image size of the image display device and the number of images that may be displayed per second, reads the digital image signal stored in the image storage memory according to the synchronization signal to output the read digital image signal to a display of the device.

Meanwhile, when the image provided from the external image generating device is an image of a game, or the like, a varied vertical synchronization signal may be used for fine and complex image representation suitable for a game screen. However, when the image display device having a fixed screen ratio is required to receive and process the image, it may be necessary to repeatedly reproduce a previous screen. This leads to a problem that the screen is shaken or an image with unnatural feeling is provided.

SUMMARY OF THE INVENTION

Therefore, an aspect of the detailed description is to provide an image display device capable of providing a stable image without screen flickering or unnatural feeling even when an image having a varied vertical synchronization signal is input, and an image processing method thereof.

Another aspect of the present invention is to provide an image display device capable of effectively correcting and processing a varied vertical synchronization signal input from the outside without adding a separate composition or changing a structure, and an image processing method thereof.

Another aspect of the present invention is to provide an image display device capable of performing a selective operation mode so that a fixed porch time may be used as needed even when a varied vertical synchronization signal is detected, and an image processing method thereof.

To achieve these and other advantages and in accordance with the purpose of this specification, as embodied and broadly described herein, an image display device includes: a synchronization signal detecting unit detecting an input vertical synchronization signal and an input horizontal synchronization signal received together with an input image signal; a synchronization signal information extracting unit extracting information related to the input image signal and an image area of the input image signal, and extracting deviation information between the image area and the synchronization signal from the detected input synchronization signal; a clock generating unit generating an output clock reference value for delaying the input vertical synchronization signal; and an output synchronization signal generating unit generating an output horizontal synchronization signal and an output vertical synchronization signal in which a front porch is varied, to correspond to an image size and the number of image frames per second allowed in the image display device based on the extracted information, wherein the output synchronization signal generating unit includes a vertical synchronization falling edge detecting unit tracking a falling edge corresponding to an initialization signal obtained by delaying the input vertical synchronization signal by the output clock reference value; and an output synchronization signal count delay unit delaying an initialization time point of a vertical counter of the input vertical synchronization signal based on the initialization signal.

Also, in an embodiment, the number of lines of a vertical sync and the vertical back porch of the output vertical synchronization signal may be maintained.

Also, in an embodiment, the synchronization signal information extracting unit may extract information related to the image area and deviation information between the image area and the synchronization signal using an input image clock received together with the input image signal.

Also, in an embodiment, the initialization signal may be generated by comparing a delayed vertical synchronization signal generated by delaying the input vertical synchronization signal by the output clock reference value with the input vertical synchronization signal based on the output clock and detecting an area in which the input vertical synchronization signal has a value of 0 and a delayed vertical synchronization signal has a value of 1 according to the comparison result.

Also, in an embodiment, when the input vertical synchronization signal is extended and varied, an initialization point of the vertical counter may be extended to output an output vertical synchronization signal in which the number of lines of the vertical front porch is increased.

Also, in an embodiment, the image display device may further include: an output synchronization signal count generating unit including a horizontal synchronization counter initializing a horizontal counter value at a time point at which the total sum of the number of pixels of the horizontal synchronization signal becomes a predetermined value and a vertical synchronization counter initializing a vertical counter value based on the initialization signal detected by the vertical synchronization falling edge detecting unit, wherein the vertical counter value and the horizontal counter value are provided to the output vertical synchronization signal count delay unit.

Also, in an embodiment, the image display device may further include: an image processing unit extracting an image signal of an image to be output to the image display device from the input image signal; an image storage unit storing the extracted image signal; and a reference clock generating unit generating a reference clock value to be used inside the image display device and providing the generated reference clock value to the image processing unit and the image storage unit.

Also, in an embodiment, the image signal stored in the image storage unit may be output in accordance with a time of the output vertical synchronization signal in which the vertical front porch is varied.

Also, in an embodiment, when the input vertical synchronization signal is received, the output synchronization signal generating unit may selectively perform any one of a first operation mode and a second operation mode in which whether the vertical front porch area is varied is different based on the extracted deviation information.

Also, in an embodiment, the output synchronization signal generating unit may initialize the input vertical synchronization signal at a fixed time point when the total sum of the number of lines of the input vertical synchronization signal becomes a predetermined value in the first operation mode and may vary the initialization time point of the input vertical synchronization signal based on the initialization signal and apply the varied initialization time in the second operation mode.

To achieve these and other advantages and in accordance with the purpose of this specification, as embodied and broadly described herein, a method for processing a signal of an image display device configured to receive an image having a varied vertical synchronization signal, includes: detecting an input synchronization signal using an input image clock; extracting an input vertical synchronization signal from the input synchronization signal; delaying the input vertical synchronization signal by a reference value of an output clock; continuously tracking a falling region of the delayed input vertical synchronization signal; and generating an output synchronization signal in which a vertical front porch is varied.

Also, in an embodiment, the number of lines of a vertical sync and the vertical back porch of the output vertical synchronization signal may be maintained.

Also, in an embodiment, the method may further include: outputting an output image signal to correspond to a time of the output synchronization signal in which the vertical front porch is varied.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings:

FIG. 2 is a diagram for explaining general processing in an image display device when a varied vertical synchronization signal is included in the image generating device.

FIG. 3 is a diagram for explaining a processing process when an image having a varied vertical synchronization signal is input in an image display device according to an embodiment of the present invention.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1A:
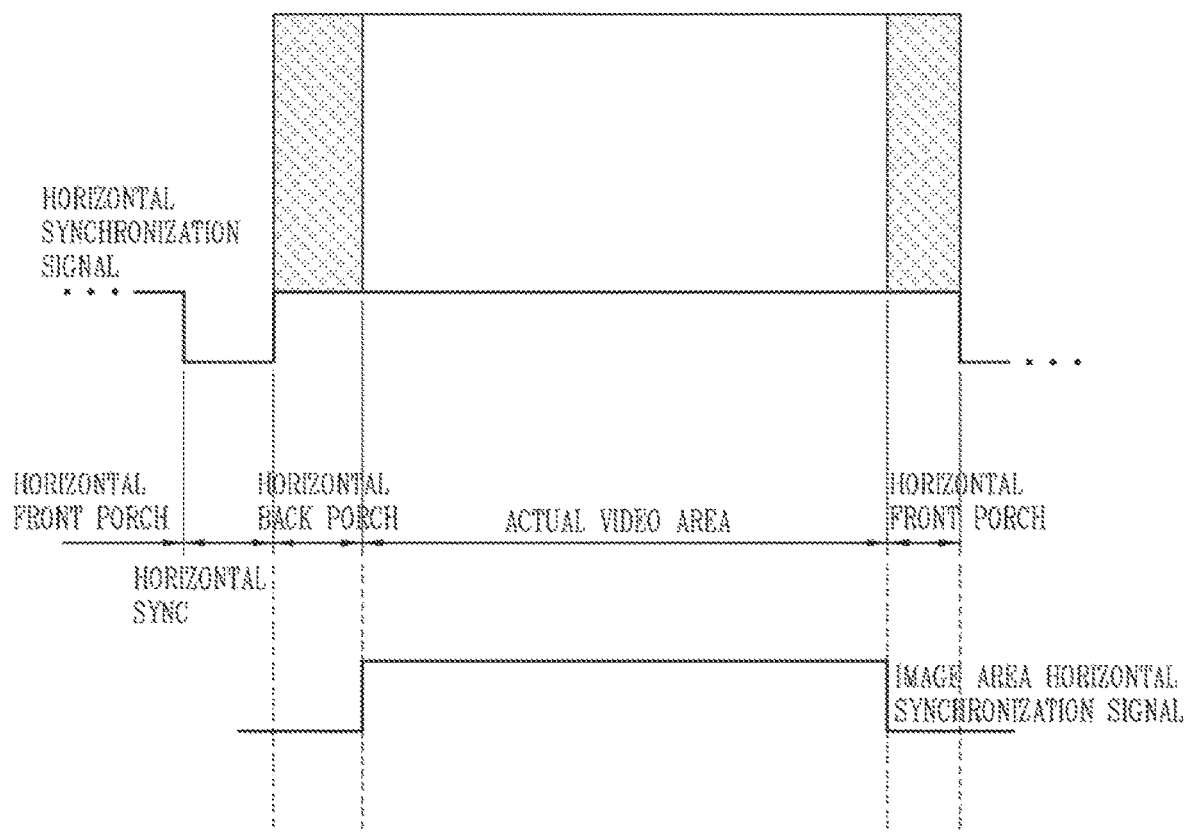
FIG. 1A is a diagram for explaining a horizontal synchronization signal.
Figure 1B:
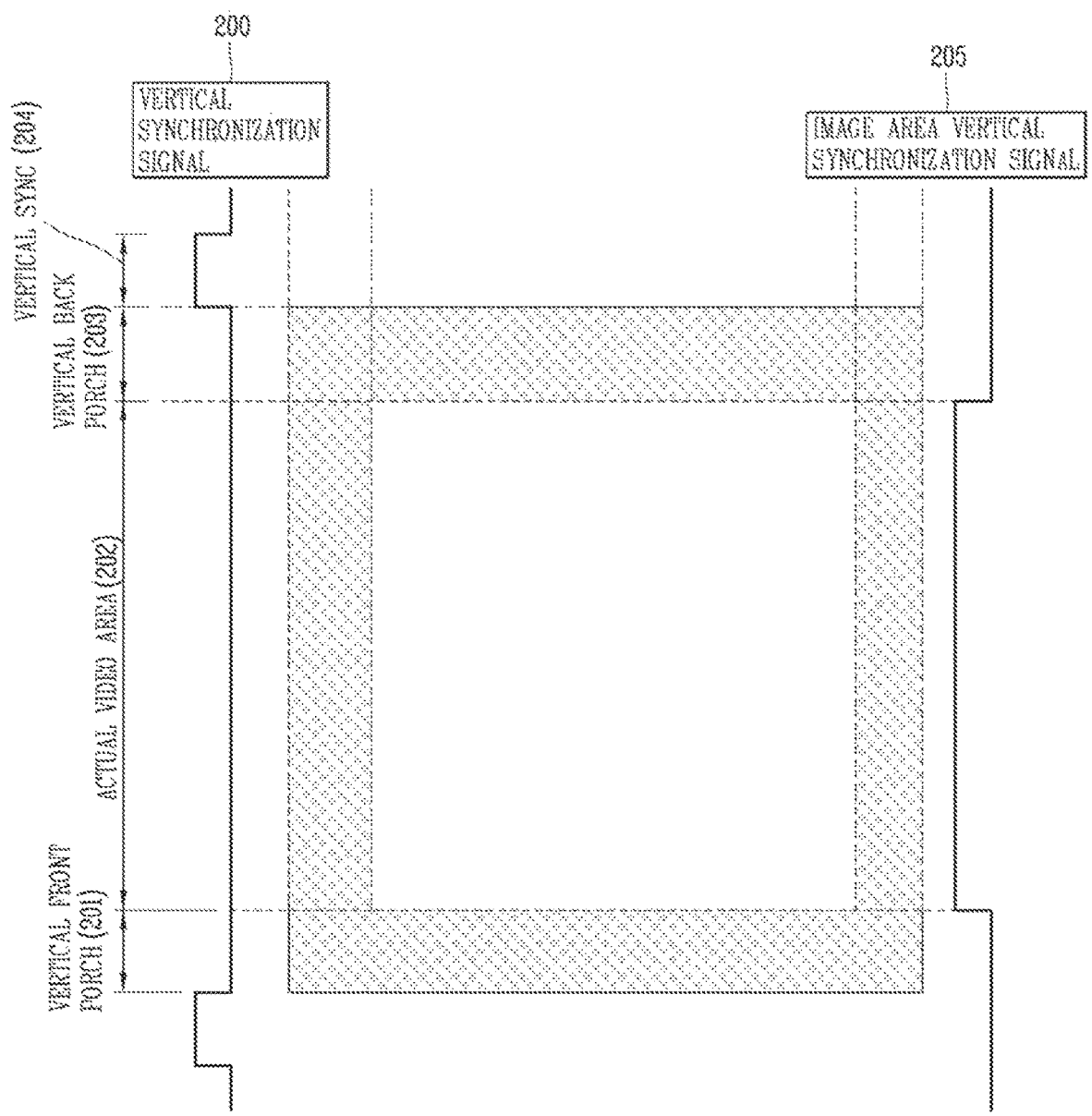
FIG. 1B is a diagram for explaining a vertical synchronization signal.

FIGS. 1A and 1B are diagrams for explaining a horizontal synchronization signal and a vertical synchronization signal described in the present invention. More specifically, FIG. 1A shows a horizontal synchronization signal, and FIG. 1B shows a vertical synchronization signal.

Referring to FIG. 1A, a pulse timing of a horizontal synchronization signal Hsync and a pulse timing of an actual video area horizontal synchronization signal are shown. The pulse timing of the horizontal synchronization signal includes a horizontal front porch, a horizontal sync, a horizontal back porch area and an actual video area. The image area horizontal synchronization signal has a pulse timing at which an image signal is output in accordance with an actual video area except for the area of the horizontal back porch and the horizontal front porch.

The horizontal synchronization signal Hsync is a signal for setting 1 horizontal period required for writing data to pixels of one line of a display panel. That is, a period of a pulse of the horizontal synchronization signal Hsync may be set to be 1 horizontal period.

Meanwhile, the vertical synchronization signal Vsync is a signal for determining 1 frame period of the display panel. A period of a pulse of the vertical synchronization signal Vsync may be set to be 1 frame period, and a frequency of the frame period as a cycle may be referred to as a display frame rate. The vertical synchronization signal Vsync is used to determine a vertical position of a displayed image.

Referring to FIG. 1B, a vertical synchronization signal Vsync 200 may include a vertical front porch 201, an actual video area 202, a vertical back porch 203, and a vertical sync 204, and an actual video area vertical synchronization signal 205 is generated by initializing a counter value of the vertical synchronization signal in a porch time.

The counter value of the vertical synchronization signal is initialized and the actual video area vertical synchronization signal 205 is generated.

The vertical back porch 203 and the vertical front porch 201 may be referred to as a display porch time. The display porch time may be referred to as an interval or an area excluding the actual video area 202 in 1 frame period.

Figure 1C:
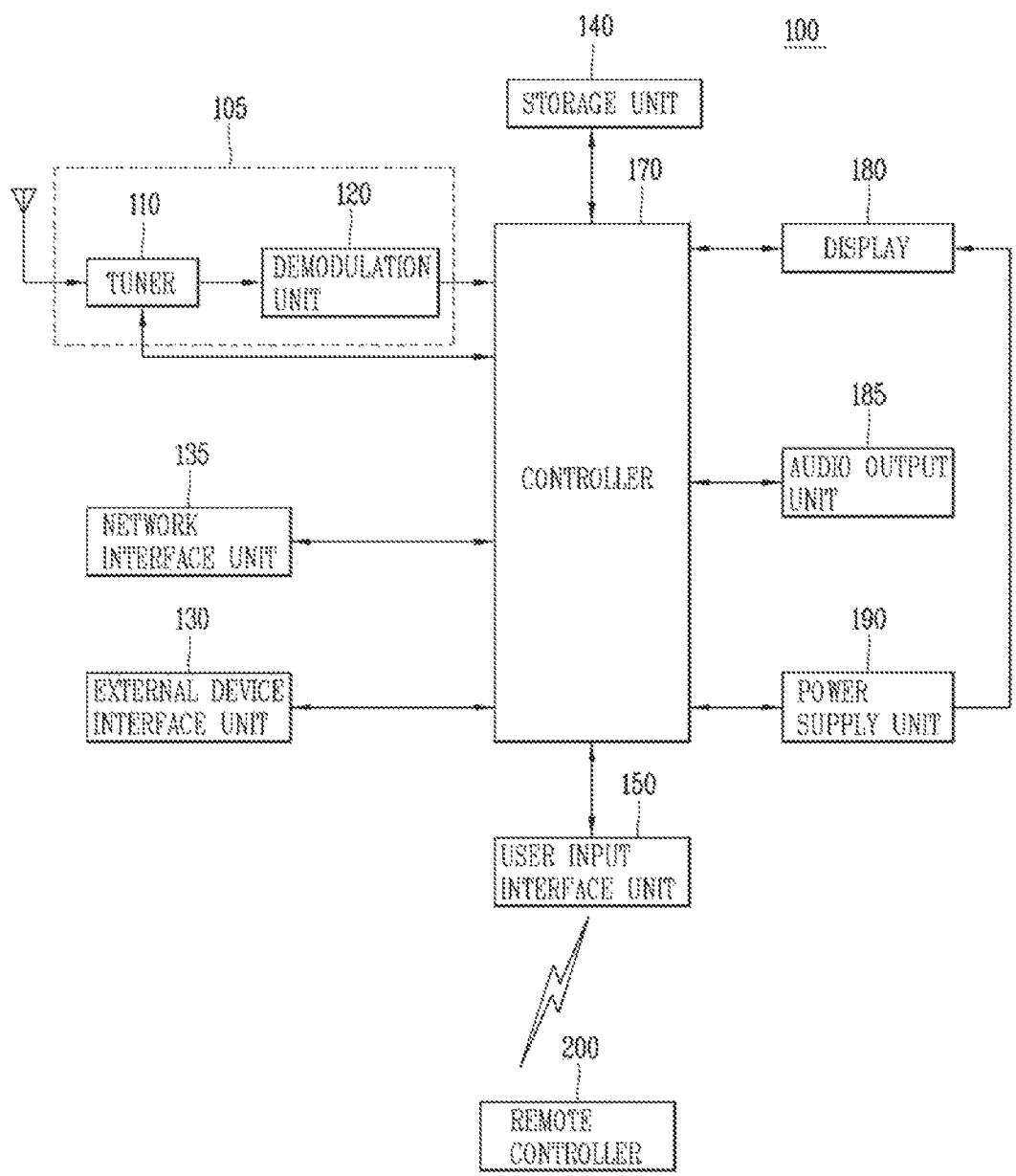
FIG. 1C is a block diagram for explaining an exemplary configuration of an image display device that processes an image input having a varied vertical synchronization signal according to an embodiment of the present invention.

FIG. 1C is an internal block diagram for explaining an exemplary configuration of an image display device for processing an image input having a varied vertical synchronization signal according to an embodiment of the present invention.

Referring to FIG. 1C, an image display device 100 according to an embodiment of the present invention may include a broadcast receiving unit 105, an external device interface unit 130, a storage unit 140, a user input interface unit 150, a sensor unit (not shown), a controller 170, a display 180, and an audio output unit 185.

The broadcast receiving unit 105 may include a tuner unit 110, a demodulation unit 120, and a network interface unit 135. Of course, it may be designed such that the tuner unit 110 and the demodulation unit 120 are included and the network interface unit 135 is not included, if necessary Conversely, it may be designed such that the network interface unit 135 is included and the tuner unit 110 and the demodulation unit 120 are not included.

The broadcast receiving unit 105 may include the external device interface unit 130, unlike the drawing. For example, it is also possible for a broadcast signal from the set-top box to be received via the external device interface unit 130.

The tuner unit 110 selects a radio frequency (RF) broadcast signal corresponding to a channel selected by a user or all previously stored channels among RF broadcast signals received through an antenna. In addition, the selected RF broadcast signal is converted into an intermediate frequency signal, a baseband image, or a sound signal.

For example, if the selected RF broadcast signal is a digital broadcast signal, it is converted into a digital IF signal (DIF). If the selected RF broadcast signal is an analog broadcast signal, it is converted into an analog baseband image or sound signal (CVBS/SIF). That is, the tuner unit 110 may process a digital broadcast signal or an analog broadcast signal. The analog baseband image or sound signal (CVBS/SIF) output from the tuner unit 110 may be directly input to the controller 170.

Meanwhile, in the present invention, the tuner unit 110 may sequentially select RF broadcast signals of all broadcast channels stored through a channel memory function among the RF broadcast signals received through the antenna, and convert the selected RF broadcast signals into an intermediate frequency signal or a baseband image or sound signal.

Meanwhile, the tuner unit 110 may include a plurality of tuners in order to receive broadcast signals of a plurality of channels. Alternatively, a single tuner that simultaneously receives broadcast signals of a plurality of channels is also possible.

The demodulation unit 120 receives the digital IF signal DIF converted by the tuner unit 110 and performs a demodulation operation.

After performing demodulation and channel coding, the demodulation unit 120 may output a stream signal TS. At this time, the stream signal may be a signal in which an image signal, a sound signal, or a data signal are multiplexed.

The stream signal output from the demodulation unit 120 may be input to the controller 170. The controller 170 performs demultiplexing, image/sound signal processing, and the like, and then outputs an image to the display 180 and outputs a voice to the audio output unit 185.

The external device interface unit 130 may transmit or receive data to and from a connected external device 190. To this end, the external device interface unit 130 may include an AN input/output unit (not shown) or a wireless communication unit (not shown).

The external device interface unit 130 may be connected to an external device such as a digital versatile disk (DVD), a Blu-ray, a game device, a camera, a camcorder, a computer (notebook), a set-top box, and the like, wiredly/wirelessly, and may perform an input/output operation with the external device. Here, the A/V input/output unit may receive video and sound signals from the external device. Meanwhile, the wireless communication unit may perform short-range wireless communication with other electronic devices.

The network interface unit 135 provides an interface for connecting the video display device 100 to a wired/wireless network including the Internet. For example, the network interface unit 135 may receive, via the network, content or data provided by the Internet or a content provider or a network operator.

The storage unit 140 may store a program for each signal processing and control in the controller 170 and store signal-processed video, audio, or data signals.

Also, the storage unit 140 may perform a function for temporarily storing video, audio, or data signals input to the external device interface unit 130. In addition, the storage unit 140 may store information on a predetermined broadcast channel through a channel memory function such as a channel map.

Meanwhile, although an embodiment in which the storage unit 140 is provided to be separate from the controller 170 is illustrated in FIG. 1C but the scope of the present invention is not limited thereto. For example, the storage unit 140 may be included in the controller 170.

The user input interface unit 150 transmits a signal input by the user to the controller 170 or a signal from the controller 170 to the user.

For example, the user input interface unit 150 may transmit/receive a user input signal such as power ON/OFF, channel selection, screen setting, and the like, to or from a remote controller 200, transfers a user input signal input from a local key (not shown) such as a power key, a channel key, a volume key, a set value, and the like, to the controller 170, transfers a user input signal input from a sensor unit (not shown) which senses a user's gesture to the controller 170, or transmit a signal from the controller 170 to the sensor unit (not shown).

The controller 170 may demultiplex an input stream or processes the demultiplexed signals through the tuner unit 110, the demodulation unit 120 or the external device interface unit 130 and generate and output a signal for video or audio output.

The image signal processed by the controller 170 may be input to the display 180 and may be displayed as an image corresponding to the image signal. In addition, the image signal processed by the controller 170 may be input to the external output device through the external device interface unit 130.

The sound signal processed by the controller 170 may be output to the audio output unit 185 as a sound. Also, the sound signal processed by the controller 170 may be input to the external output device through the external device interface unit 130.

Although not shown in FIG. 1C, the controller 170 may further include a demultiplexing unit and an image processing unit. In this regard, the components illustrated in FIG. 3 are detailed configurations of the controller 170 of the image display device 100 or an image processing unit inside the controller 170. This will be described in more detail below with reference to FIG. 3.

Before describing the present invention, FIG. 2 is a diagram for explaining a general process in a conventional image display device when a varied vertical synchronization signal is included in an image generating device.

First, referring to (a) of FIG. 2, an image in which a vertical synchronization signal is varied may be generated by an image generating device. For example, screen 1 may be generated to have 16 frame bits per second, and screen 2 may be generated to have 20 frame bits per second. That is, an image having a varied vertical synchronization signal in which the interval of the vertical synchronization signal is longer than that of screen 1 may be generated.

As illustrated in (b) of FIG. 2, in the general video display device, the screen 2 may not be reproduced because all of the video information of the screen 2 has not been stored in the memory although it's the turn of the vertical synchronization signal in which the screen 2 is to be displayed. Thus, when the varied vertical synchronization signal is input, the screen 1 is repeatedly reproduced, which gives a viewer a feeling of screen shake or unnaturalness.

Accordingly, The present invention implements an image display device capable of finely and precisely displaying a screen according to an intention of an image generating device when an input image in which a vertical synchronization signal is varied by a central processing unit (CPU) or a screen processing unit (GPU) of an external image generating device and comes to be displayed on the image display device and providing a natural image without screen shake or tearing on the way, while minimizing screen delay, and an image processing method thereof.

Hereinafter, FIG. 3 is a diagram for explaining a processing process when an image having a varied vertical synchronization signal is input in the image display device 100 according to the embodiment of the present invention. FIG. 3 illustrates a detailed configuration of the controller 170 (or the controller 170 and the storage unit 140) of the image display device 100.

Referring to FIG. 3, the controller 170 or an image processing unit of the controller 170 as a component of the image display device 100 for processing an input of an image having a varied vertical synchronization signal may include synchronization signal detecting unit 210, a synchronization signal information extracting unit 220, an output image synchronization signal generating unit 230, a reference clock generating unit 240, an image processing unit 250, an output clock generating unit 260, and an image storage unit 270.

The synchronous signal detecting unit 210 detects whether a digital input vertical synchronization signal 10 and a digital input horizontal synchronization signal 20 are input by using an internal input image clock 40 together with an image input. Also, the synchronization signal detecting unit 210 may determine whether the detected digital input vertical synchronization signal 10 and the digital input horizontal synchronization signal 20 are stabilized signals.

The synchronization signal information extracting unit 220 extracts synchronization signal information from the digital input vertical synchronization signal 10, the digital input horizontal synchronization signal 20, and the input image clock 40, and transfers an extracted input vertical synchronization signal 225 to an output image synchronization signal generating unit 230.

More specifically, the synchronization signal information extracting unit 220 extracts length, period, and stability information of the synchronization signal using the internal input image clock 40 for each of the digital input vertical synchronization signal 10 and the digital input horizontal synchronization signal 20.

The synchronization signal information extracting unit 220 may further extract length information for extracting an actual video area portion of the digital input image signal 30 and deviation information between the actual video area of the synchronization signal and the synchronization signal.

The synchronization signal information extracting unit 220 may extract information related to the image area and deviation information between the image area and the synchronization signal using the input image clock 40 received together with the input image signal. Here, the input image clock 40 may be provided from the external image generating device.

The output image synchronization signal generating unit 230 generates a horizontal synchronization signal 70 and a vertical synchronization signal 80 corrected based on a reference value of an output clock generated by the output clock generating unit 260 and provides the generated horizontal synchronization signal 70 and vertical synchronization signal 80 to the image storage unit 270.

The output image synchronization signal generating unit 230 generates a synchronization signal initialization signal and continuously tracks the vertical synchronization signal.

In another example, the output image synchronization signal generating unit 230 may select any one of the original input vertical synchronization signal 10 and a vertical synchronization signal regarding an actual video area created through tracking information of a synchronization signal, i.e., a vertical synchronization signal in which a porch time is varied, according to an input situation, and generate an initialization signal of the synchronization signal regarding an output image using the selected vertical synchronization signal. This will be described in detail with reference to FIG. 6B below.

The output image synchronization signal generating unit 230 generates a vertical synchronization signal and a horizontal synchronization signal by adjusting an actual image signal to an image size allowed in the image display device and the number of images per second. To this end, the output image synchronization signal generating unit 230 corrects the output synchronization signal in accordance with the varied input vertical synchronization signal, and initializes each output synchronization signal in accordance with the input vertical synchronization signal.

The output image synchronization signal generating unit 230 generates an output horizontal synchronization signal and an output vertical synchronization signal in which a vertical front porch is varied to correspond to an image size and the number of image frames per second allowed in the image display device based on information extracted from the synchronization signal information extracting unit 220, for example, information related to an image area and deviation information between the image area and the synchronization signal.

At this time, in the output horizontal synchronization signal, only the vertical front porch time is varied or extended and the vertical sync and the vertical back porch time may be maintained at a predetermined fixed value. Alternatively, in another example, only the vertical back porch time, instead of the vertical front porch time, may be varied or extended The reference clock generating unit 240 generates a reference clock value 60 to be used in the image display device and provides the generated reference clock value 60 to the image processing unit 250 and the image storing unit 270.

The image processing unit 250 receives the digital input image signal 30, extracts an actual image signal 50 from the digital input image signal 30, and provides the extracted image signal 50 to the image storage unit 270. Specifically, the image processing unit 250 may extract only an actual image portion from the digital input image signal 30 applied at the same time as the digital input vertical synchronization signal 10 and the digital input horizontal synchronization signal 20 and processes the extracted portion so as to be stored in an internal memory region.

To this end, the image processing unit 250 identifies (distinguishes) an actual video area by applying a magnitude and deviation information of the input signal obtained from the synchronization signal information extracting unit 220 to the digital input image signal 30, and sequentially stores the identified actual video area in the image storage unit 270 using an internal reference clock and internal image information transfer method.

The image storage unit 270 stores the vertical synchronization signal and the horizontal synchronization signal generated by the output image synchronization signal generating unit 230. Thereafter, the image stored in the image storage unit 270 is output at a time point that coincides with a time of the corresponding synchronization signal. Specifically, the digital output vertical synchronization signal, the digital output horizontal synchronization signal 280 and the digital output image signal 290 stored in the image storing unit 270 are output in synchronization with the time of the synchronization signal.

The output clock generating unit 260 generates an output clock reference value for delaying the input vertical synchronization signal 10 and transmits the generated output clock reference value to the output image synchronization signal generating unit 230.

Figure 4:
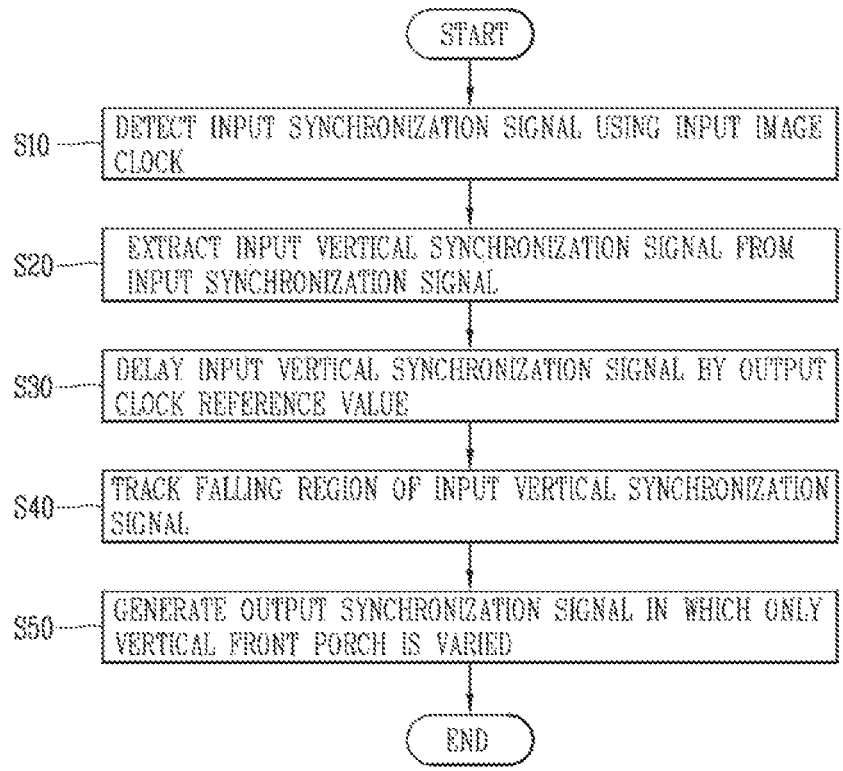
FIG. 4 is a flowchart illustrating a processing process when an image having a varied vertical synchronization signal is input in an image display device according to an embodiment of the present invention.

FIG. 4 is a flowchart illustrating a processing process when an image having a varied vertical synchronization signal is input in an image display device according to an embodiment of the present invention.

Referring to FIG. 4, when an input image including a varied vertical synchronization signal is received in the image display device 100, the reception of the input synchronization signal is detected using an input image clock (S10).

Next, a synchronization signal information is extracted from the input synchronization signal to extract an input vertical synchronization signal (S20). Then, a process of delaying the input vertical synchronization signal by the output clock reference value is performed (S30). Thereafter, the falling area of the input vertical synchronization signal is continuously tracked (S40). Then, an output vertical synchronization signal in which only a vertical front porch is finally changed is finally generated (S50).

In one embodiment, the number of lines of a vertical sync and the number of lines of a vertical back porch of the output vertical synchronization signal maintain predetermined values.

When the output vertical synchronization signal in which only the vertical front porch is changed is finally generated, an output image signal is output to correspond to a time of the output synchronization signal.

As described above, according to the embodiment of the present invention, a final video output synchronization signal may be generated in accordance with a synchronization signal of a video image input having a varied vertical synchronization. Also, since only a video data storage space for one frame of image is used without delay of an image, it is possible to cope with an input image having a varied vertical synchronization signal without burdening a load. Accordingly, even when the input image includes the varied vertical synchronization signal, a stable output image is provided without unnaturalness such as screen shake or tearing.

Referring back to FIG. 3, the synchronization signal information extracting unit 220 generates the image area vertical synchronization signal 205 illustrated on the right side of FIG. 1B by using the synchronization signal information such as the vertical front porch 201, the vertical back porch 203, and the vertical sync 204, etc., illustrated on the left side of FIG. 1B. The generated image area vertical synchronization signal 205 is transferred to the output image synchronization signal generating unit 230 of FIG. 3.

Figure 5:
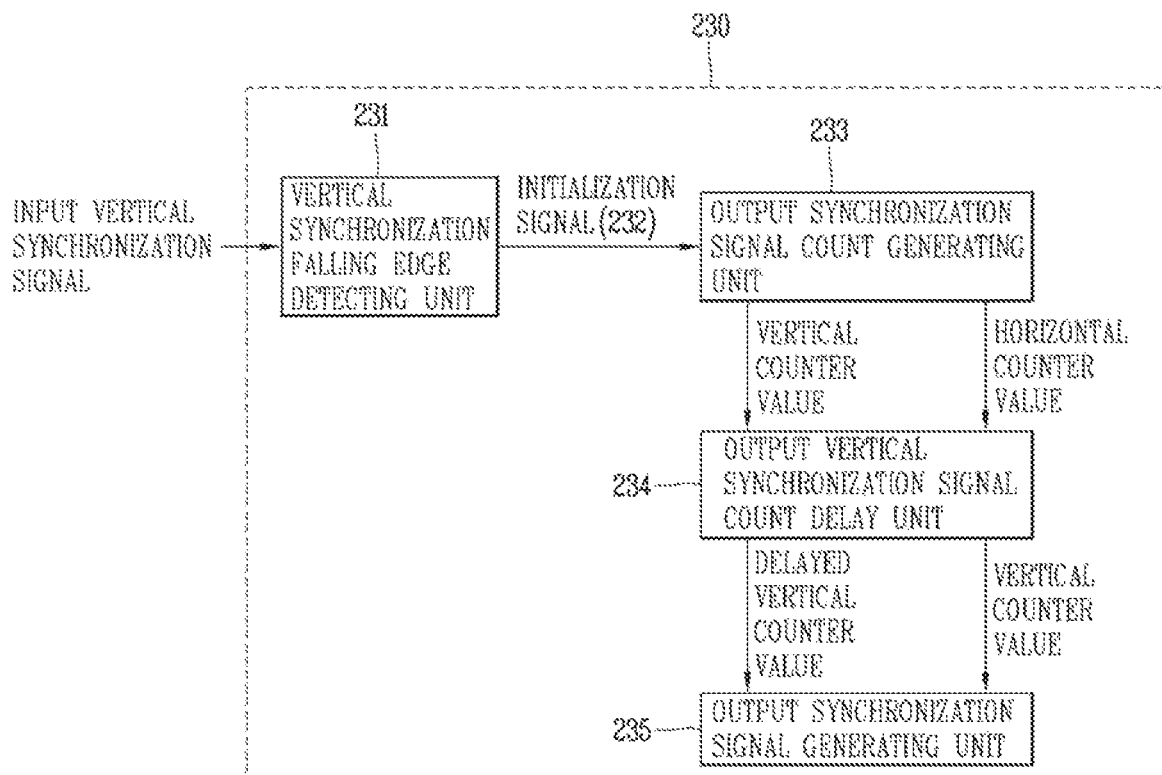
FIG. 5 is an exemplary block diagram illustrating a detailed configuration of an output image synchronization signal generating unit illustrated in FIG. 3.

FIG. 5 shows a detailed configuration of the output image synchronization signal generating unit 230. As illustrated in FIG. 5, the output image synchronization signal generating unit 230 includes a vertical synchronization falling edge detecting unit 231, an output synchronization signal count generating unit 233, a vertical synchronization signal count delay unit 234, and an output synchronization signal generating unit 235.

The vertical synchronization falling edge detecting unit 231 delays the input vertical synchronization signal by the output clock reference value to generate an initialization signal.

To this end, the delayed vertical synchronization signal generated by delaying the input vertical synchronization signal by the output clock reference value generated by the output clock generating unit 260 is compared with the input vertical synchronization signal based on the output clock. Then, the initialization signal may be generated by detecting an area in which the input vertical synchronization signal has a value of '0' and the delayed vertical synchronization signal has a value of '1' according to the comparison result.

Figure 6A:
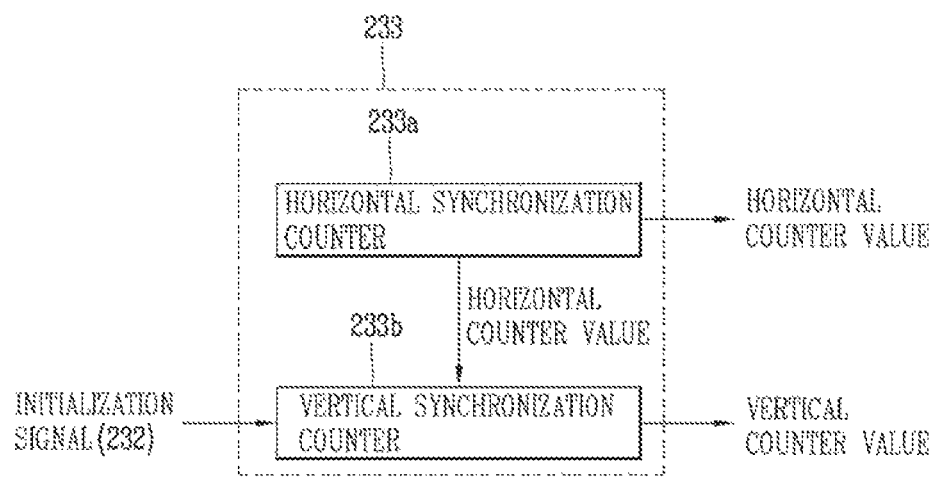
FIG. 6A is an exemplary block diagram illustrating a detailed configuration of a synchronization signal count generating unit illustrated in FIG. 5.

The output synchronization signal count generating unit 233 generates a vertical counter value and a horizontal counter value. Referring to FIG. 6A, the output synchronization signal count generating unit 233 may include a horizontal synchronization counter 233a generating a horizontal counter value based on the initialization signal 232 and a vertical synchronization counter 233b generating a vertical counter value.

In FIG. 6A, the horizontal synchronization counter 233a initializes the horizontal counter value at a time point when the sum of the number of pixels of the horizontal synchronization signal is equal to a predetermined value. Here, the predetermined value may refer to that the total sum of the number of pixels of the front porch, the back porch, and the sync of the horizontal synchronization signal is a maximum value.

The vertical synchronization counter 233b initializes a vertical counter value based on the initialization signal generated by the vertical synchronization falling edge detecting unit 231. Therefore, when the input vertical synchronization signal is extended and varied, a counter initialization time of the vertical synchronization counter 233b is also extended.

Referring back to FIG. 5, the output vertical synchronization signal count delay unit 234 delays an initialization time of the vertical counter of the input vertical synchronization signal based on the initialization signal 232 and the vertical and horizontal counter values. Accordingly, the generated delay vertical counter value and the fixed horizontal counter value are provided to the output synchronization signal generating unit 235.

As the initialization time of the vertical counter is extended, the output synchronization signal generating unit 235 generates a final output vertical synchronization signal in which the number of lines of the vertical front porch is increased.

Figure 7:
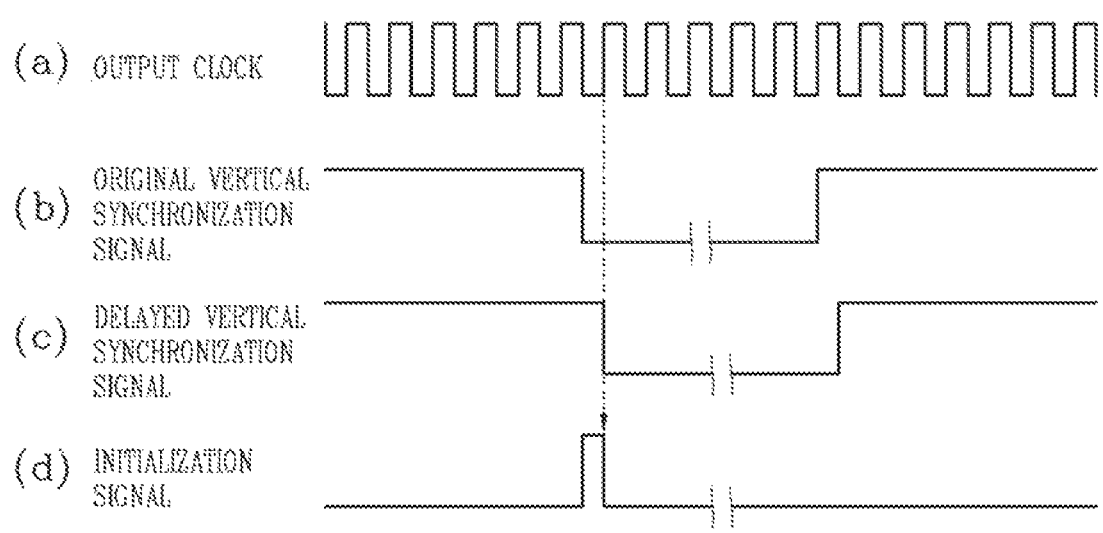
FIG. 7 is a diagram for explaining a process of generating an initialization signal using a delayed vertical synchronization signal generated by a vertical synchronization falling edge detecting unit illustrated in FIG. 5.

Referring to FIG. 7, the vertical synchronization falling edge detecting unit 231 delays an input vertical synchronization signal (b) applied by the synchronization signal information extracting unit 220 by the output clock (a) to generate a vertical synchronization signal (c) as illustrated in FIG. 7. Also, the vertical synchronization falling edge detecting unit 231 compares the original input vertical synchronization signal (b) and the delayed vertical synchronization signal (c) on the basis of the output clock (a) and generates the initialization signal (d) having an area in which the original vertical synchronization signal (b) has a value of '0' and the delayed vertical synchronization signal (c) has a value of '1'.

Figure 8:
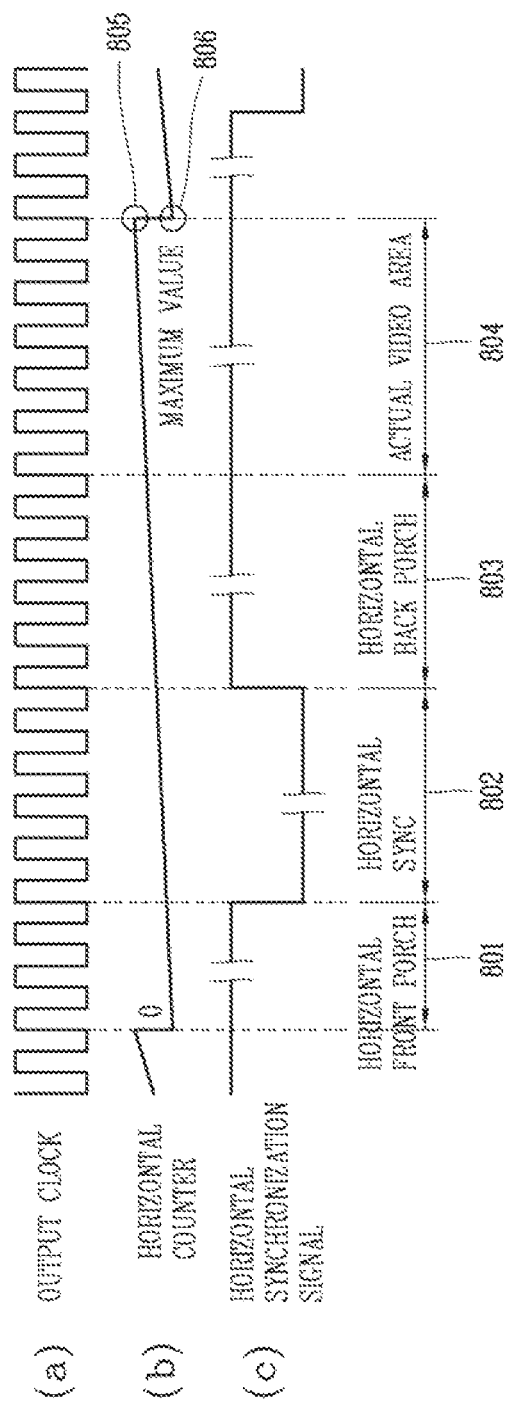
FIGS. 8 and 9 are views for explaining a horizontal synchronization signal count and a vertical synchronization signal count in an image display device according to an embodiment of the present invention.

Referring to FIGS. 6A and 8, when the total sum of the number of pixels of the horizontal front porch 801, the number of pixels of the horizontal sync 802, the number of pixels of the horizontal back porch 803, and the number of pixels of the actual video area 804, as synchronization signal information, determined by the user is equal to the maximum value 805, the horizontal synchronization signal counter 233a initializes (806) the count to 0. Thereafter, the horizontal synchronization signal counter 233a repeats the counting operation. That is, in FIG. 8, the horizontal count (b) is not initialized by the initialization signal but continues to be repeated.

Figure 9:
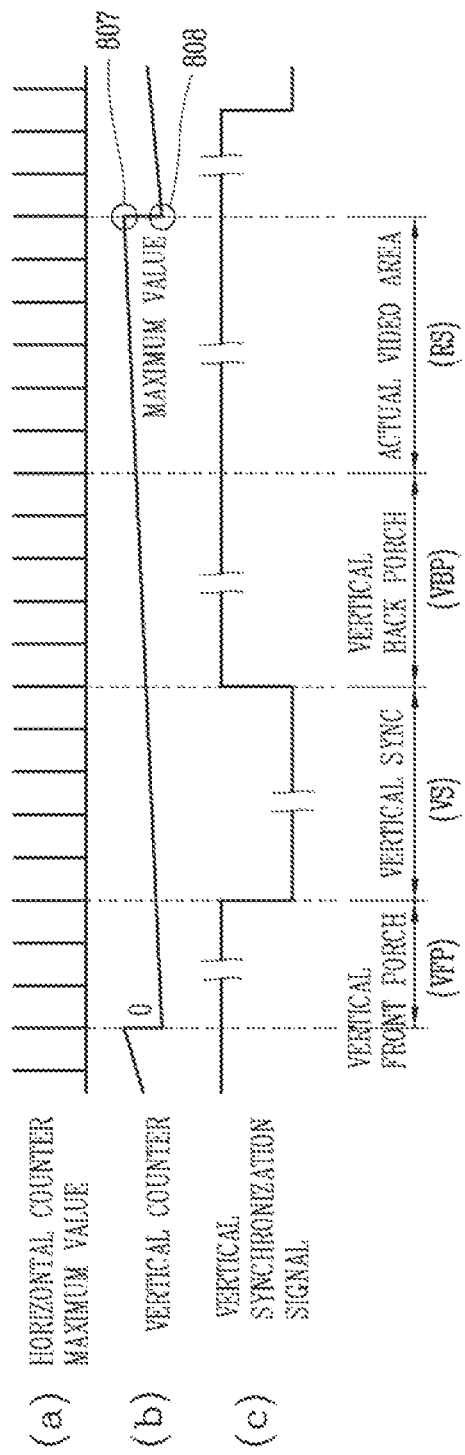

Also, referring to FIG. 6A and FIG. 9, in the vertical synchronization signal counter 233b, the vertical counter (b) tracks a maximum value (a) of the horizontal counter, and whenever a maximum value of the number of pixels of one line is generated, the vertical counter is counted (increased) by 1. The vertical counter value is initialized to 0 (808) when the total sum of the number of lines of the vertical front porch (VPF), the number of lines of the vertical sync (VS), the number of lines of the vertical back porch (VBP), and the number of lines of the actual video area (RS), as determined synchronization signal information, is equal to the maximum value 807. Thereafter, the count operation is repeated again.

Figure 10:
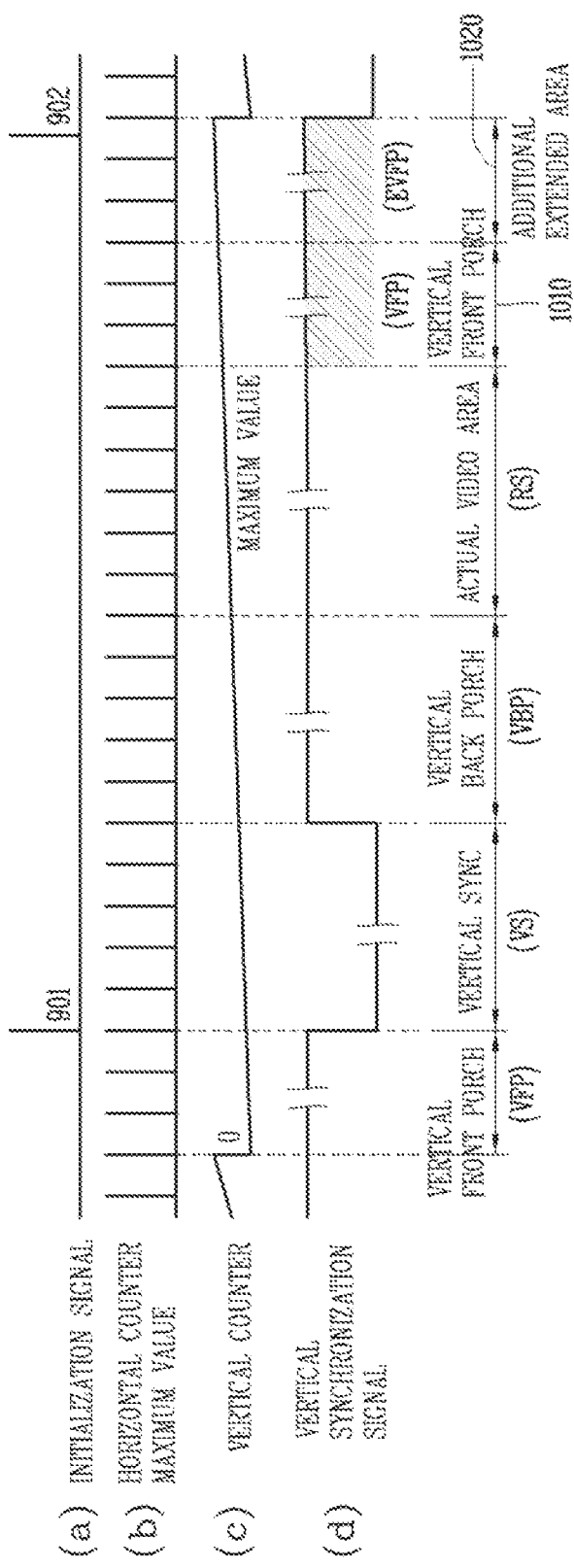
FIGS. 10 and 11 are views for explaining varying a vertical front porch to process an image when an image having a varied vertical synchronization signal is input in an image display device according to an embodiment of the present invention.

However, in correction for the variable input sync signal, as illustrated in FIG. 10, a point at which counting is initialized is not a time point at which the total sum of the predetermined synchronization signal information becomes a maximum value, but vertical counting is initialized by the initialization signal (a) detected or generated by the vertical synchronization falling edge detecting unit 231.

A first position 901 in FIG. 10 indicates the initialization time when the input synchronization signal is not varied (normal input).

Meanwhile, in a second position 902 of FIG. 10, the input synchronization signal is extended to cause the initialization time to be pushed, and a pulse timing in which the number of lines of the vertical front porches of the output vertical synchronization signal (d) is increased is finally output by the vertical count (c) in which the initialization time point was extended. Accordingly, it has an additional extended area (EVFP) 1020 adjacent to the original vertical front porch area (VFP) 1010.

Figure 6B:
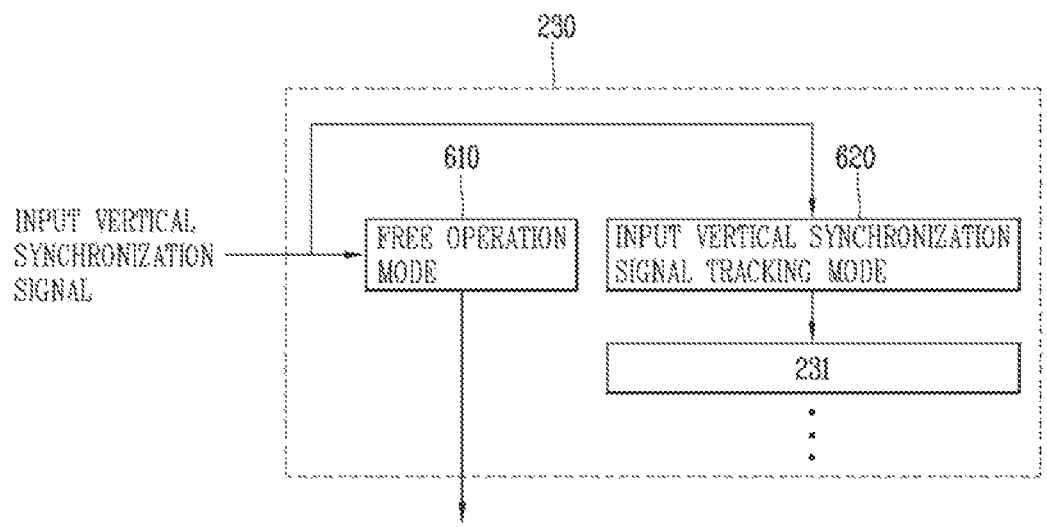
FIG. 6B is a diagram for explaining selectively performing a plurality of operation modes in the output synchronization signal generating unit illustrated in FIG. 5.

Meanwhile, FIG. 6B is a diagram for explaining that the output synchronization signal generating unit 230 illustrated in FIG. 5 selectively performs a plurality of operation modes.

Specifically, although the varied vertical synchronization signal is detected, a porch time is not changed by tracking the detected varied vertical synchronization signal but an output vertical synchronization signal is generated to output an image by the fixed number of frames, e.g., by the number of 60 frames per second.

This is because the varied vertical synchronization signal is not intentionally generated for detailed representation of an image but a problem may arise if an output synchronization signal in which a porch time is continuously varied is output by tracking the varied vertical synchronization signal even in an unintentional case or even in case where an error occurs.

In this case, when the input vertical synchronization signal is received, the output synchronization signal generating unit 230 may selectively perform any one of a first operation mode and a second operation mode in which whether the vertical front porch area is varied is different, based on the deviation information extracted by the synchronization signal information extracting unit 220.

In one embodiment, the first operation mode is an operation mode in which the vertical front porch area is maintained by a predetermined value, and the second operation mode is an operation mode in which the vertical front porch area is corrected to have a variable value when the varied vertical synchronization signal is detected.

In the first operation mode, the output synchronization signal generating unit 230 initializes the input vertical synchronization signal at a fixed time point when the total sum of the number of lines of the input vertical synchronization signal becomes a predetermined value, and in the second operation mode, the output synchronization signal generating unit 230 may vary the initialization time point of the input vertical synchronization signal based on the initialization time and apply the varied initialization time.

Also, in one embodiment, the output synchronization signal generating unit 230 may generate and/or apply a reference for selecting any one of the first operation mode or the second operation mode.

For example, referring to FIG. 6B, when the varied vertical synchronization signal is detected, an input vertical synchronization signal tracking mode 620, rather than a free operation mode 610, may be triggered to be performed. When the input vertical synchronization signal tracking mode 620 is performed, an initialization signal for delaying the input vertical synchronization signal is generated according to the operation of the vertical synchronization falling edge detecting unit 231 described above.

As another example, although the varied vertical synchronization signal is detected, the output synchronization signal generating unit 230 may operate to perform the free operation mode 610 when an event such as an error is detected. To this end, when an event such as an error is detected, the output synchronization signal generating unit 230 or the controller 170 of the image display device 100 notifies about an error generation signal, thus operating to limit tracking of the varied input vertical synchronization signal.

Figure 11:
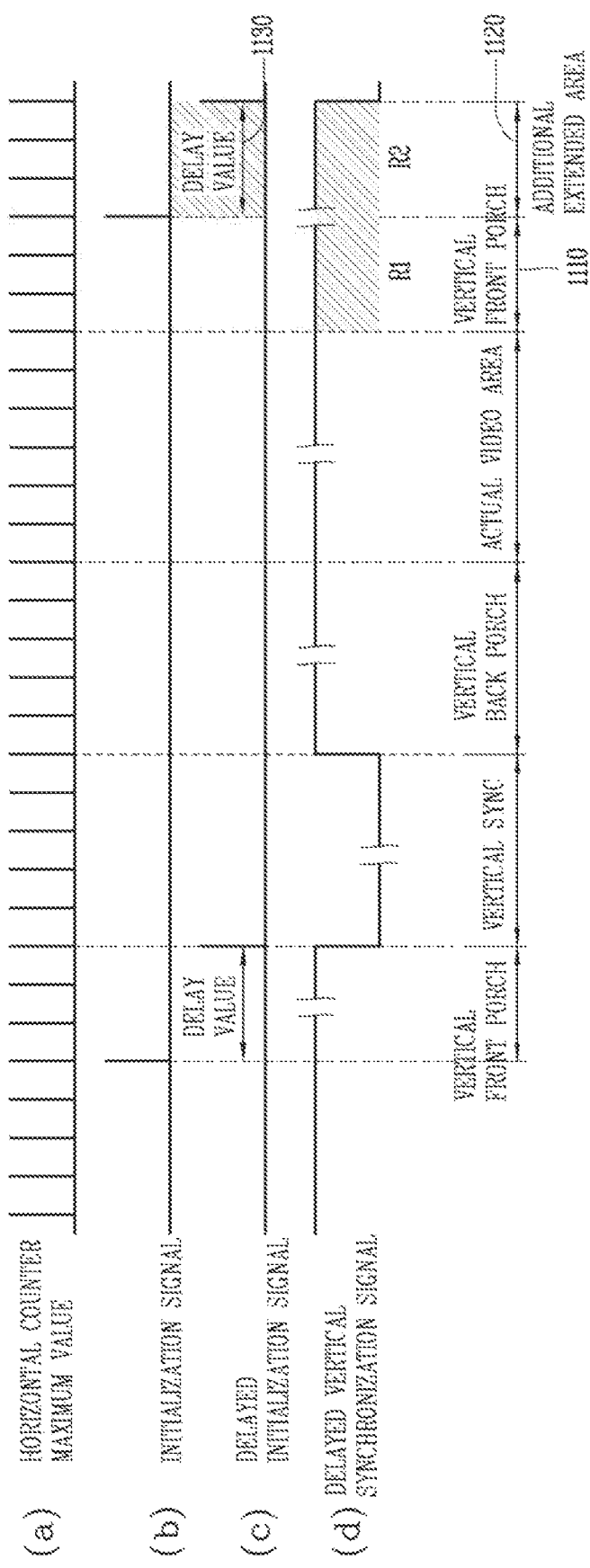

Referring to FIGS. 5 and 11, the output vertical synchronization signal delay unit 234 delays the vertical synchronization signal generated by the initialization signal in the output synchronization signal count generating unit 233 by the value of the output clock reference desired by the user.

In this regard, referring to FIG. 11, the delayed initialization signal (c) is generated by delaying the initialization signal (b) generated by delaying the vertical synchronization signal by the delayed pixel value on the basis of the output clock. The delayed initialization signal (c) has a delay value 1130. The vertical synchronization signal is delayed based on the delayed initialization signal (c). Accordingly, the delayed vertical synchronous signal (d) is obtained.

The delayed vertical synchronization signal (d) has an additional extended area R2 1120 which is expanded and varied by the delay value 1130 of the delayed initialization signal (c) in addition to the original vertical front porch area R1 1110.

Here, the delayed pixel value is determined by a processing time until the image display device stores the input signal in the internal memory and then reads the input signal from the internal memory, for an image input having the varied vertical synchronization signal. This delay value 1130 plays an important role in generating and correcting natural image without screen tearing.

Figure 12:
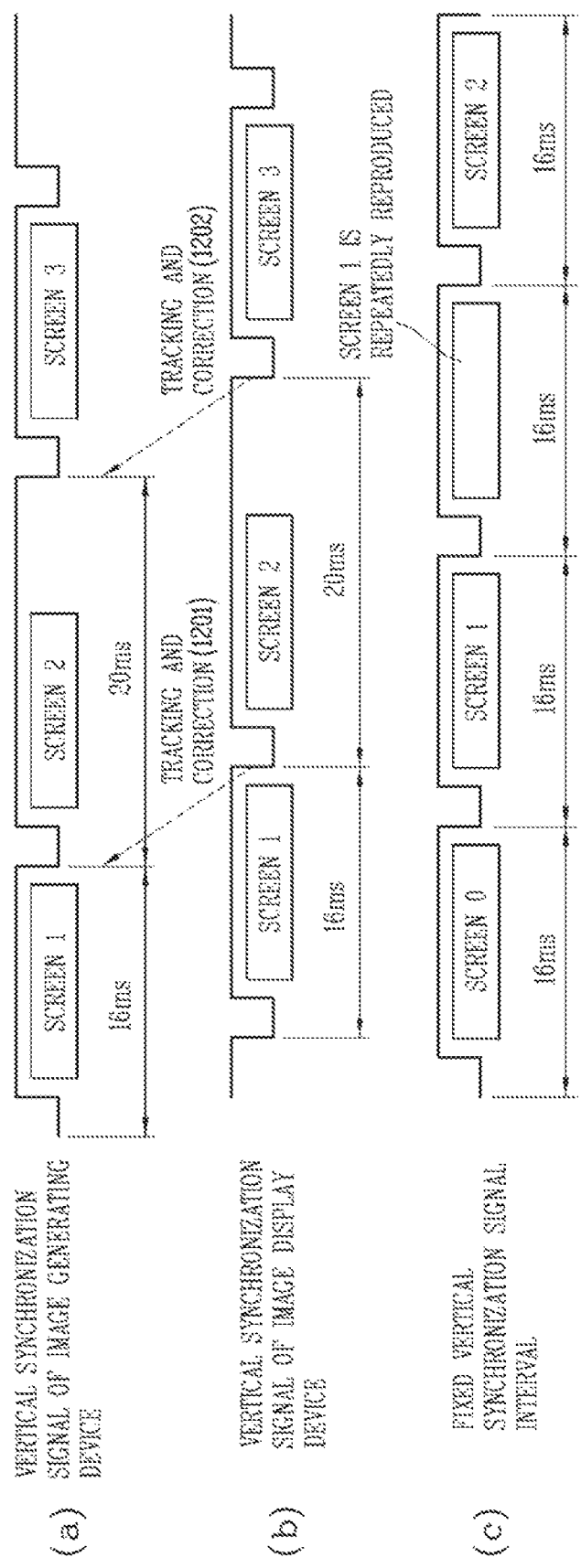
FIG. 12 is a view for explaining a final output vertical synchronization signal when an image having a varied vertical synchronization signal is input in the image display device according to the embodiment of the present invention.

Referring to FIG. 12, the output synchronization signal generating unit 235 of FIG. 5 continuously tracks and corrects a falling region of the input vertical synchronization signal as illustrated in (b) of FIG. 12 based on the horizontal synchronization counter value generated by the output synchronization signal count generating unit 233 and the delayed vertical synchronization counter value generated by the vertical synchronization count delay unit 234. Accordingly, the output synchronization signal generating unit 235 generates final output synchronization signals corrected by a certain delay value by the user (1201, 1202).

When this is compared with the fixed vertical synchronization signal interval (c), screen reproducing is delayed (screen 0, screen 1, . . . ) due to a time during which all of the screens (screen 1, screen 2, . . . ) of the vertical synchronization signal (a) of the image generating device are stored in the memory one by one and read again, and an unnatural feeling such as screen shake, or the like, occurs as the screen 1 is repeatedly reproduced due to the vertical synchronization signal varied and extended in screen 2. In addition, since the screen 2 is reproduced in fixed 16 ms instead of 20 ms, unnaturalness due to screen tearing is also detected.

Also, in one embodiment, an indicator indicating that a varied vertical synchronization signal is input to one area of the display 180 of the image display device 100 may be displayed. In addition, in one embodiment, an independent image correcting device separate from the image display device 100 may be implemented to have the structure of FIG. 3 described above.

As described above, when the output image synchronization signal is generated by correcting the synchronization signal of the input image having the varied vertical synchronization, only the number of lines of the vertical front porch including lines of the horizontal synchronization signal is varied, while the number of pixels of the horizontal front porch, the number of pixels of the horizontal sync, the number of the pixels of the horizontal back porch, the number of pixels of an actual image, the number of lines of pixels of the vertical sync, and the number of lines of the actual image are applied to be always constant. Accordingly, a natural final image output synchronization signal may be generated in accordance with the synchronization signal of the image input having the varied synchronization signal without image delay.

As described above, the image display device and image correction method of the image display device according to the embodiment of the present invention may provide a natural image without screen shake or tearing even when an input image introduced with vertical synchronization varied from an external image generating device and provide an effect of minimizing screen delay.

Further, there is an advantage that a separate component is not added to process an image signal or the structure is rarely changed. Further, even when the varied vertical synchronization signal is detected, the operation mode using the fixed porch time may be selectively performed, instead of varying the porch time uniformly, so that signal processing may be more effectively performed.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, Therefore, all changes and modifications that fall within the metes and bounds of the claims, or equivalents of such metes and bounds are therefore intended to be embraced by the appended claims.

What is claimed is:

1. An image display device comprising a controller configured to perform operations including:
    detecting an input vertical synchronization signal and an input horizontal synchronization signal received together with an input image signal;
    extracting information related to the input image signal and an image area of the input image signal, and extracting deviation information between the image area and the input vertical synchronization signal and the input horizontal synchronization signal;
    generating an output clock reference value for delaying the input vertical synchronization signal; and
    generating an output horizontal synchronization signal and an output vertical synchronization signal in which a front porch is varied, to correspond to an image size and a number of image frames per second allowed in the image display device based on the extracted information,
    wherein the controller is further configured to perform operations including:
    tracking a falling edge corresponding to an initialization signal obtained by delaying the input vertical synchronization signal by the output clock reference value; and
    delaying an initialization time point of a vertical counter of the input vertical synchronization signal based on the initialization signal.

2. The image display device of claim 1, wherein a number of lines of a vertical sync and a vertical back porch of the output vertical synchronization signal is maintained.

3. The image display device of claim 1, wherein the controller is further configured to extract the information related to the image area and the deviation information between the image area and the input vertical synchronization signal and input horizontal synchronization signal using an input image clock received together with the input image signal.

4. The image display device of claim 1, wherein the initialization signal is generated by comparing a delayed vertical synchronization signal generated by delaying the input vertical synchronization signal by the output clock reference value with the input vertical synchronization signal based on an output clock and detecting an area in which the input vertical synchronization signal has a value of 0 and the delayed vertical synchronization signal has a value of 1 according to a comparison result.

5. The image display device of claim 1, wherein when the input vertical synchronization signal is extended and varied, the initialization time point of the vertical counter is extended to output the output vertical synchronization signal in which a number of lines of a vertical front porch is increased.

6. The image display device of claim 1, wherein the controller is further configured to:
    initialize a horizontal counter value at a time point at which a total sum of a number of pixels of the output horizontal synchronization signal becomes a predetermined value; and
    initialize a vertical counter value based on the initialization signal.

7. The image display device of claim 1, further comprising a memory,
    wherein the controller is further configured to:
    extract an image signal of an image to be output to the image display device from the input image signal;
    cause the memory to store the extracted image signal; and
    generate a reference clock value to be used inside the image display device and provide the generated reference clock value to the memory.

8. The image display device of claim 7, wherein the extracted image signal stored in the memory is output in accordance with a time of the output vertical synchronization signal in which a vertical front porch is varied.

9. The image display device of claim 1, wherein, when the input vertical synchronization signal is received, the controller is further configured to selectively perform any one of a first operation mode and a second operation mode in which whether a vertical front porch area is varied is different based on the extracted deviation information.

10. The image display device of claim 9, wherein the controller is further configured to initialize the input vertical synchronization signal at a fixed time point when a total sum of a number of lines of the input vertical synchronization signal becomes a predetermined value in the first operation mode, and varies the initialization time point of the input vertical synchronization signal based on the initialization signal and apply the varied initialization time point in the second operation mode.

11. A method for processing a signal of an image display device configured to receive an image having a varied vertical synchronization signal, the method comprising:
    detecting an input synchronization signal using an input image clock;
    extracting, from the input synchronization signal, an input vertical synchronization signal;
    delaying the input vertical synchronization signal by a reference value of an output clock;
    tracking a falling region of the delayed input vertical synchronization signal; and
    generating an output vertical synchronization signal in which a vertical front porch is varied,
    wherein a number of lines of a vertical sync and a vertical back porch of the output vertical synchronization signal is maintained.

12. The method of claim 11, further comprising:
    outputting an output image signal to correspond to a time of the output vertical synchronization signal in which the vertical front porch is varied.

* * * * *